United States Patent
Malone et al.

(10) Patent No.: US 11,400,914 B2
(45) Date of Patent: Aug. 2, 2022

(54) AUTONOMOUS READY VEHICLE

(71) Applicant: Polaris Industries Inc., Medina, MN (US)

(72) Inventors: Amber P. Malone, Stacy, MN (US); David J. Koenig, Wyoming, MN (US); Kevin P. Blair, Roseau, MN (US); Patrick D. Weldon, Roseville, MN (US); Cole A. Sytsma, Rochester, MN (US)

(73) Assignee: Polaris Industries Inc., Medina, MN (US)

( * ) Notice: Subject to any disclaimer, the term of this patent is extended or adjusted under 35 U.S.C. 154(b) by 125 days.

(21) Appl. No.: 16/855,603

(22) Filed: Apr. 22, 2020

(65) Prior Publication Data

US 2020/0298818 A1    Sep. 24, 2020

Related U.S. Application Data

(63) Continuation of application No. 16/218,025, filed on Dec. 12, 2018, now Pat. No. 10,640,101, which is a
(Continued)

(51) Int. Cl.
*B60W 10/10* (2012.01)
*B60W 10/18* (2012.01)
(Continued)

(52) U.S. Cl.
CPC ............ *B60W 10/10* (2013.01); *B60W 10/18* (2013.01); *B60W 10/20* (2013.01); *B60W 50/12* (2013.01);
(Continued)

(58) Field of Classification Search
CPC ...... B60W 10/10; B60W 10/18; B60W 10/20; B60W 50/12; G05D 1/0022; H04L 12/403
(Continued)

(56) References Cited

U.S. PATENT DOCUMENTS 7,299,099 B1    11/2007    Divelbiss et al.
8,534,397 B2    9/2013    Grajkowski et al.
(Continued)

FOREIGN PATENT DOCUMENTS

CA    2314307 A1    1/2002
EP    1598245 A2    11/2005
(Continued)

OTHER PUBLICATIONS

English translation of Office Action issued by the Israel Patent Office, dated Sep. 15, 2020, for Israeli Patent Application No. 252060; 5 pages.
(Continued)

*Primary Examiner* — Yazan A Soofi
(74) *Attorney, Agent, or Firm* — Faegre Drinker Biddle & Reath LLP

(57) ABSTRACT

A system and method for interfacing an autonomous or remote control drive-by-wire controller with a vehicle's control modules. Vehicle functions including steering, braking, starting, etc. are controllable by wire via a control network. A CAN architecture is used as an interface between the remote/autonomous controller and the vehicle's control modules. A CAN module interface provides communication between a vehicle control system and a supervisory, remote, autonomous, or drive-by-wire controller. The interface permits the supervisory control to control vehicle operation within pre-determined bounds and using control algorithms.

22 Claims, 6 Drawing Sheets

Related U.S. Application Data continuation of application No. 14/968,487, filed on Dec. 14, 2015, now Pat. No. 10,160,436.

(60) Provisional application No. 62/091,946, filed on Dec. 15, 2014.

(51) Int. Cl.
*B60W 10/20* (2006.01)
*B60W 50/12* (2012.01)
*H04L 12/403* (2006.01)
*G05D 1/00* (2006.01)
*B60W 50/00* (2006.01)

(52) U.S. Cl.
CPC ......... *G05D 1/0022* (2013.01); *H04L 12/403* (2013.01); *B60W 2050/0006* (2013.01); *B60W 2050/0071* (2013.01); *B60W 2050/0091* (2013.01); *B60W 2050/0094* (2013.01); *B60W 2556/45* (2020.02); *B60W 2556/55* (2020.02)

(58) Field of Classification Search
USPC .......................................................... 701/23
See application file for complete search history.

(56) References Cited

U.S. PATENT DOCUMENTS

| | | | |
|---|---|---|---|
| 8,843,244 B2 * | 9/2014 | Phillips | G05D 1/0094 701/2 |
| 9,156,476 B2 | 10/2015 | O'Neill et al. | |
| 9,205,717 B2 | 12/2015 | Brady et al. | |
| 10,160,436 B2 | 12/2018 | Malone et al. | |
| 10,640,101 B2 | 5/2020 | Malone et al. | |
| 2010/0250053 A1 | 9/2010 | Grill et al. | |
| 2011/0071718 A1 * | 3/2011 | Norris | G05D 1/0088 701/23 |
| 2013/0212659 A1 | 8/2013 | Maher et al. | |
| 2013/0222133 A1 | 8/2013 | Schultz et al. | |
| 2013/0304514 A1 | 11/2013 | Hyde et al. | |
| 2014/0125018 A1 | 5/2014 | Brady et al. | |
| 2014/0143839 A1 * | 5/2014 | Ricci | H04N 21/25816 726/4 |
| 2014/0156134 A1 * | 6/2014 | Cullinane | B60W 50/082 701/23 |
| 2014/0244110 A1 | 8/2014 | Tharaldson et al. | |
| 2014/0288763 A1 | 9/2014 | Bennett et al. | |
| 2014/0303827 A1 * | 10/2014 | Dolgov | B60W 30/00 701/23 |
| 2014/0350768 A1 | 11/2014 | Filippov et al. | |
| 2015/0032293 A1 | 1/2015 | O'Neill et al. | |
| 2016/0127895 A1 | 5/2016 | Bangole et al. | |
| 2016/0133130 A1 | 5/2016 | Grimm et al. | |
| 2017/0017734 A1 | 1/2017 | Groh et al. | |
| 2017/0137023 A1 * | 5/2017 | Anderson | B60G 17/02 |
| 2017/0138108 A1 | 5/2017 | Kothari | |
| 2017/0139413 A1 | 5/2017 | James | |
| 2017/0192427 A1 | 7/2017 | Bivans et al. | |
| 2018/0053401 A1 | 2/2018 | Martin et al. | |
| 2018/0143035 A1 * | 5/2018 | Ricci | G06Q 30/0266 |
| 2019/0118792 A1 | 4/2019 | Malone et al. | |

FOREIGN PATENT DOCUMENTS

| | | | |
|---|---|---|---|
| JP | 2003-118550 | A | 4/2003 |
| JP | 2003-195909 | A | 7/2003 |
| JP | 2006-320033 | A | 11/2006 |
| WO | 2014/134148 | A2 | 9/2014 |

OTHER PUBLICATIONS

English translation of Decision of Refusal issued by the Japanese Patent Office, dated Oct. 1, 2020, for Japanese Patent Application No. 2017-530636; 3 pages.
Office Action issued by the Mexican Patent Office, dated Nov. 9, 2020, for Mexican Patent Application No. MX/a/2020/000059; 3 pages.
Memo regarding Office Action issued by the Mexican Patent Office, dated Nov. 9, 2020, for Mexican Patent Application No. MX/a/2020/000059; 1 pages.
Communication Pursuant to Article 94(3) EPC issued by the European Patent Office, dated Dec. 5, 2018, for European Patent Application No. 15820394.3; 4 pages.
Examination Report No. 1 issued by the Australian Government IP Australia, dated Apr. 8, 2019, for Australian Patent Application No. 2015362825; 3 pages.
Extended Search Report issued by the European Patent Office, dated May 23, 2019, for European Patent Application No. 19165018; 9 pages.
International Preliminary Report on Patentability received for PCT Patent Application No. PCT/US2015/065586, dated Feb. 23, 2017, 23 pages.
International Search Report issued by the European Patent Office, dated Mar. 11, 2016, for International Patent Application No. PCT/US2015/065586; 4 pages.
Office Action issued by the Canadian Intellectual Property Office, dated May 16, 2019, for Canadian Patent Application No. 2,969,155; 4 pages.
Second Written Opinion issued by the European Patent Office, dated Nov. 24, 2016, for International Patent Application No. PCT/US2015/065586; 7 pages.
Wei et al., "Towards a viable autonomous driving research platform", 2013 IEEE Intelligent Vehicles Symposium (IV), IEEE, Jun. 23, 2013, pp. 763-770.
Written Opinion issued by the European Patent Office, dated Mar. 11, 2016; for International Patent Application No. PCT/US2015/065586; 7 pages.
Communication pursuant to Article 94(3) issued by the European Patent Office, dated Mar. 12, 2020, for European Patent Application No. 19165018.3; 6 pages.

* cited by examiner

AUTONOMOUS READY VEHICLE

CROSS-REFERENCE TO RELATED APPLICATIONS

The present application is a continuation of U.S. patent application Ser. No. 16/218,025, filed Dec. 12, 2018, which is a continuation of U.S. patent application Ser. No. 14/968,487 filed Dec. 14, 2015, titled "AUTONOMOUS READY VEHICLE", which is a non-provisional application that claims priority to U.S. Provisional Application Ser. No. 62/091,946; filed Dec. 15, 2014, the complete disclosure of which are expressly incorporated herein by reference.

BACKGROUND AND SUMMARY

The present disclosure an autonomous ready vehicle. More particularly, the present disclosure relates to a vehicle configured to receive commands from an autonomous controller or remote controller to control vehicle functions.

In one illustrated embodiment of the present disclosure, a system and method are provided for interfacing an autonomous or remote control drive-by-wire controller with a vehicle's control modules. Vehicle functions including steering, braking, starting, etc. are controllable by wire via a control network. For example, a CAN architecture available from Polaris Industries, Inc. is used as an interface between the remote/autonomous controller and the vehicle's control modules in an illustrated embodiment of the present disclosure. A CAN module interface illustratively provides communication between a vehicle control system and a supervisory, remote, autonomous, or drive-by-wire controller. The interface permits the supervisory control to control vehicle operation within pre-determined bounds and using control algorithms.

In another embodiment, a vehicle is provided including a communication network having a plurality of vehicle devices coupled thereto; a vehicle control unit coupled to the communication network and able to control a first subset of the plurality of devices via the communication network to effect vehicle operation; the vehicle control unit operable to receive input from a second subset of the vehicle devices via the network and to control the first subset of the plurality of devices responsive to the input received from the second subset of vehicle devices, input from the second subset of vehicle devices being indicative of operator interaction with one or more of the vehicle devices; and a network interface; the network interface operable to couple to an autonomous vehicle controller such that the autonomous vehicle controller is able to effect vehicle operation via the first subset of vehicle devices independent of input from the second subset of vehicle devices.

According to another embodiment of the present disclosure, a method of providing autonomous vehicle operation is provided including: providing a vehicle with a communication network having a plurality of vehicle operation devices coupled thereto, the plurality of vehicle operation devices being capable of operating the vehicle, the plurality of vehicle operation devices including a first subset of devices that operate based upon instructions from a vehicle control unit, the plurality of vehicle operation devices including a second subset of devices that provide input to the vehicle control unit, the input being indicative of operator interaction with one or more of the vehicle devices; and providing an interface to the communication network; receiving, via the interface, input from an autonomous vehicle controller, thereby allowing the autonomous vehicle controller to control the first subset of vehicle devices independent of input from the second subset of vehicle devices.

According to another embodiment of the present disclosure, a computer readable media having non-transitory instructions thereon is provided that when interpreted by a processor cause the processor to: provide instructions to a first subset of vehicle devices capable of operating a vehicle, the first subset of device operate based upon instructions from a vehicle control unit, the instructions being provided via a vehicle communication network; receive input, via the communication network, from a second subset of vehicle devices, the input being indicative of operator interaction with one or more of the vehicle devices; and receive, via an interface to the communication network, input from an autonomous vehicle controller, thereby allowing the autonomous vehicle controller to control the first subset of vehicle devices independent of input from the second subset of vehicle devices.

Additional features of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

For the purposes of promoting an understanding of the principles of the present disclosure, reference will now be made to certain illustrated embodiments and drawings. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

U.S. Patent Application Publication No. 2014/0288763; U.S. Pat. No. 8,534,397; PCT International Publication No. WO 2014/134148; and U.S. Patent Application Publication No. 2014/0244110 are all expressly incorporated by reference herein. Features disclosed herein may be used in combination with features disclosed in these patent documents.

Figure 1:
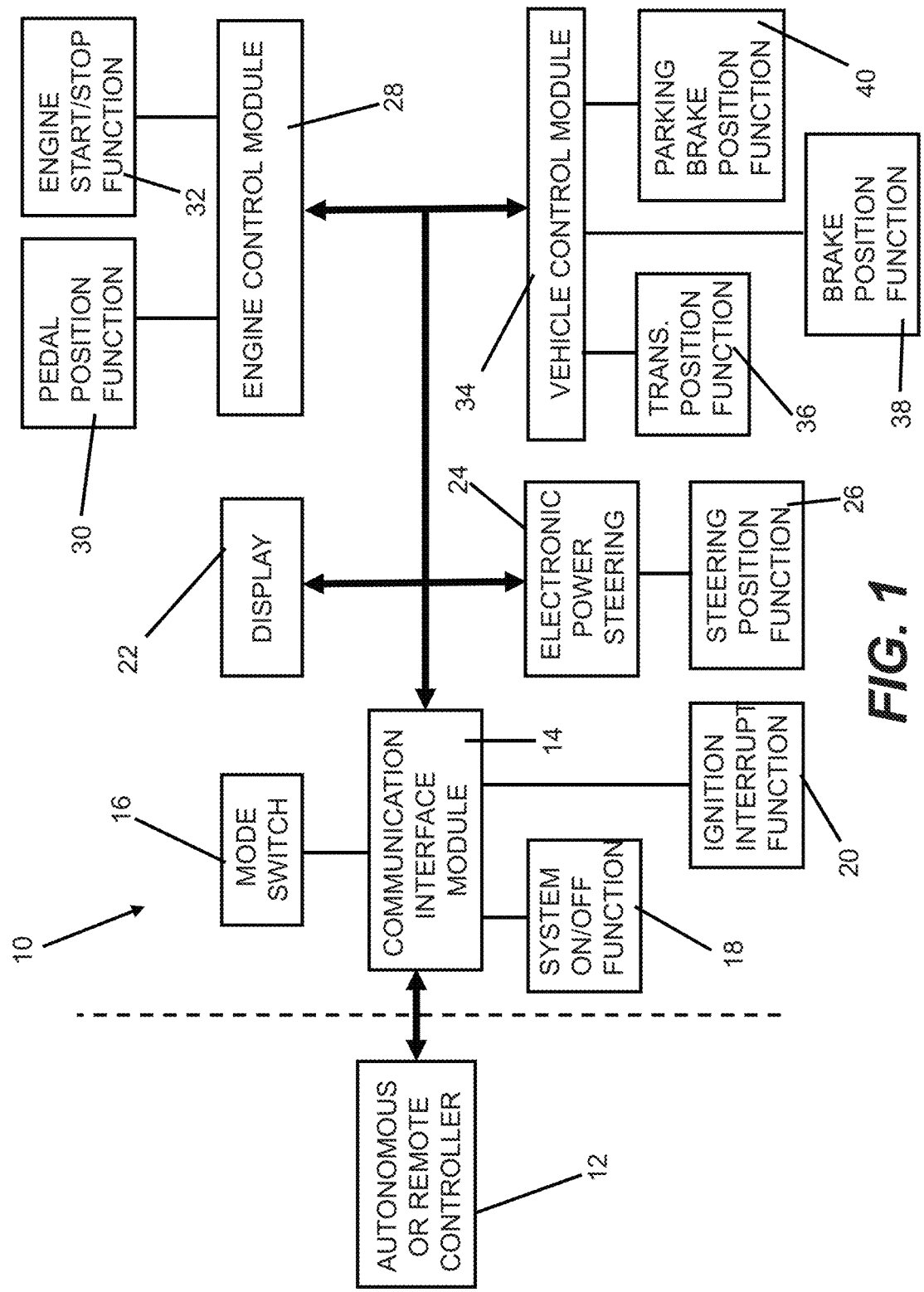
FIG. 1 is a block diagram illustrating components of an autonomous ready vehicle of an illustrated embodiment of the present disclosure.

FIG. 1 illustrates components of an autonomous ready vehicle 10 of the present disclosure. Vehicle 10 is configured to be controlled by an autonomous or remote controller 12. The controller 12 may be an autonomous controller for controlling the vehicle 10 without any human interaction. The controller 12 may also be a remote controller where an operator uses an input device such as pedals, a joystick, a computer, or other controller to guide the vehicle 10. Functions of the controller 12 also include obstacle avoidance. The controller 12 sends specific commands to the vehicle 10 to control movement of the vehicle. Controller 12 also receives feedback from the vehicle 10. Communication with the controller 12 is provided through a gateway interface module or communication interface module (CIM) 14 on the vehicle 10. In an illustrated embodiment, the communication interface module is a Controller Area Network (CAN) module. CIM 14 packages information for transport between components.

A mode switch 16 coupled to module 14 permits a user to select between a manual operation mode and the autonomous or remote control mode. In the manual mode, the vehicle 10 is operated by a driver in a normal manner (via operator action on vehicle devices such as a steering device, (such as handles, wheel, joystick), a brake pedal, a gear shift, an accelerator pedal, and an ignition switch (or a sensor that detects operation of any of the foregoing) that respectively cause operation of other vehicle devices, such as a steering device (such as a steering tie arm), a brake actuator, an transmission shifter controller, a throttle, and an ignition relay (generally any vehicle device or actuators for operating such devices). Overall, it should be appreciated that for any operational input device, embodiments are envisioned that utilize physical connections and embodiments are envisioned where sensors are placed on input devices and operation of the devices is communicated via electrical signals. Likewise, embodiments are envisioned where physical connections are used to drive action in actuators and embodiments are envisioned where actuators receive electrical signals that instruct their operation.

In one embodiment, the mode switch 16 is a physical switch. In other embodiments, the mode switch 16 is actuated in software using one of a manned and autonomous or remote user input. The communication interface module 14 controls a system on/off function 18 and an ignition interrupt function 20. The communication interface module 14 also communicates with a display 22 within the vehicle 10. The display 22 is preferably a high resolution color display. The display 22 may also be provided by a vehicle gauge display.

Communication interface module 14 further communicates with an electronic power steering control 24. The power steering control 24 controls a steering position function 26 for guiding the vehicle 10.

Communication interface module 14 further communicates with an engine control module (ECM) 28. The ECM 28 controls and responds to a pedal position function 30. ECM 28 further controls an engine start/stop function 32. The pedal position function 30 receives instruction from the network interface module 14 whether to accept actual position of the foot pedal or an acceleration command received from controller 12 for controlling the vehicle throttle position. For example, in manual mode the pedal position function 30 takes the physical response from the pedal for throttle application, whereas in autonomous or remote mode the controller 12 provides a percentage of throttle that is to be applied in the same manner as the physical application of the throttle.

Communication interface module 14 further communicates with a vehicle control module 34. The vehicle control module 34 controls a transmission position function 36, a brake position function 38, and a parking brake position function 40. Shifting of the vehicle is controlled by a driver during manual mode or by signals received from the controller 12 through communication interface module (CIM) 14 in the autonomous or remote control mode. The vehicle control module 34 also provides vehicle status and sensor information through communication interface module 14 back to the controller 12. The vehicle status and sensor information includes, for example, vehicle speed, steering angle, requested speeds, requested steering angles, brake status, fuel level, accelerometer data, brake sensors, throttle position sensors, wheel speed sensors, gear selection sensors, temperature sensors, pressure sensors, emissions levels, trouble codes, error messages, or the like. The brake position function 38 is illustratively implemented using an i-Booster intelligent brake control available from Bosch.

Furthermore, in the event of interaction or conflicting messages between the ECM 28 pedal position function 30 and VCM 34 brake position function 38 the CIM 14 will filter the appropriate communication messages to pass to the external controller 12, thus avoiding interaction issues regarding the input or pedal positions.

The vehicle control module 34 controls the transmission position function 36 by detecting a request to shift gears and then providing a shifting signal when conditions are right. Brake position function receives inputs from a pedal position detector and brake commands received over the communication interface module 14 to apply the vehicle brakes 38 or the parking brake 40.

Autonomous or remote controller 12 may also control suspension components through the communication interface module 14. Vehicle sensors outputs are received and processed by controller 12 and signals are then sent from controller 12 through communication interface module 14 to control adjustable springs or adjustable shocks the vehicle suspension. See, for example, U.S. Patent Application Publication No. 2014/0125018 and U.S. application Ser. No. 14/507,355, filed on Oct. 6, 2014, the disclosures of which are expressly incorporated by reference herein for details of adjustable suspension components.

Figure 2:
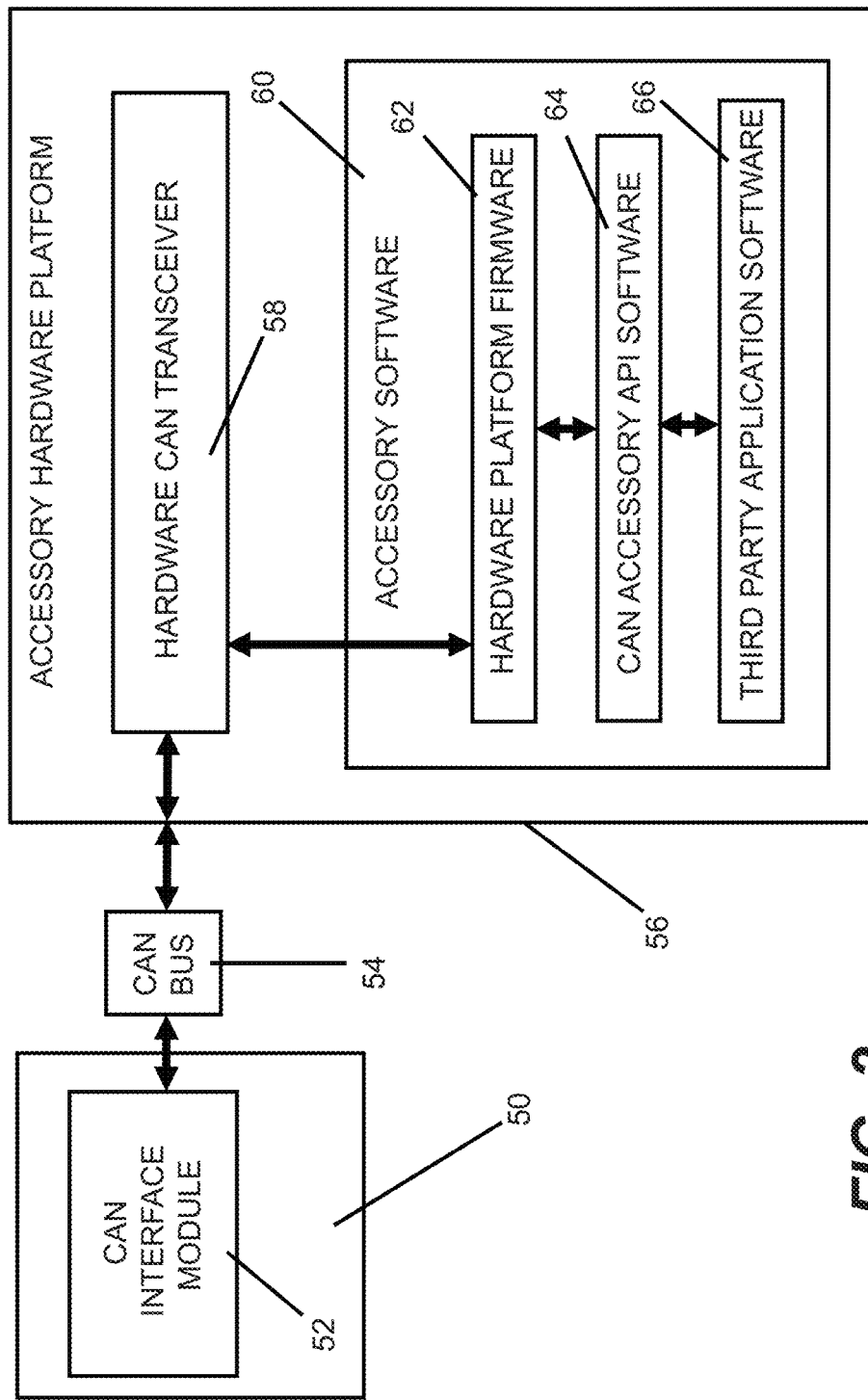
FIG. 2 is a block diagram illustrating communication between a CAN communication network module of the vehicle and an accessory hardware platform and accessory software.

FIG. 2 illustrates an exemplary accessory integration device 50 having an accessory CAN port 52 which communicates through a CAN bus 54 to an accessory hardware platform 56 of the vehicle 10. Specifically, the CAN bus 54 communicates with a hardware CAN transceiver 58. Transceiver 58 communicates with hardware platform firmware 62 of accessory software 60. The hardware platform firmware 62 communicates with CAN accessory application programming interface (API) software 64. The API software 64 communicates with third party application software 66.

The CAN accessory API software 64 includes a compiled code library. The library provides an interface between a proprietary CAN network and an application programmer's application code. This allows a third party accessory creator to access specific and limited information on the CAN network, therefore enabling the creation of smart accessories, without access to proprietary information of the CAN network, and without the ability to interfere with vehicle communications. Further, this interface does not allow for compromising the vehicles intended operation or network security.

In one embodiment, the compiled code library includes a set of proprietary, secure, and predefined function calls. The function calls include items such as getEngineRPM( ) getVehicleSpeed( ) or getEngineTemperature( ) for example. The third party application programmer may use these function calls to bring the accessible vehicle information into their application code.

In one example, the code library may be compatible with large open source electronics platforms. In addition to the software library, a quick start custom accessory includes a durable housing and hardware peripherals that the third party developer may use. The peripherals include, for example, an LED bar and a basic LCD display, etc.

The present disclosure permits any third party to create software applications for use with the vehicle without interfering with the other functionality of the vehicle. Therefore, third parties can develop smart accessories for use with the vehicle. This enables vehicle users to drive innovation in vehicle accessories.

Conflict Resolution

In one embodiment, when conflicts arise between individual or multiple manual inputs and input instructions received from the autonomous or remote controller 12 when the vehicle 10 is in the autonomous or remote control mode, the vehicle may respond with a manual override of autonomous control and the CIM 14 may continue to watch the remote input messages without executing the instructions, while continuing to send CAN messages.

In another embodiment, a user is detected in the vehicle, i.e, via an input torque sensed on the steering wheel, therefore allowing manual operation to override specific or all functions of autonomy.

Another embodiment includes autonomous or remote controller 12 override of manual control inputs to the vehicle. For example, messages may be detected from the controller 12 allowing for autonomous control to override specific or all functions of manned mode operation.

Some vehicles implement a switch to transition from autonomous or remote mode to manned mode. In some examples, the switch position will override the conflicting messages. For example, if the switch is in autonomous mode, and messages are received from the vehicle pedals, the vehicle will continue to operate in autonomous mode.

Brake-Throttle interactions in Autonomy

In some instances, inputs may comprise manned and autonomy or remote messages that are conflicting or occur simultaneously. For example, if commands are sensed for brake application and throttle application, the CIM 14 may be calibrated so that the brake application takes precedence. Furthermore, profiles may determine whether the pedal positions were intended actions. If the actions were unintended the vehicle may enter a lockout mode. Otherwise, the responses of the vehicle controls may be calibrated to pre-selected limits.

In another instance, the vehicle's response may include a blended application of at least one of the manned and autonomous or remote inputs. For example, the CIM 14 may receive messages for throttle application and brake application. A blended response may reduce the throttle to a calibrated level low enough such that the vehicle brakes will overcome the throttle application to the engine. In other situations, alternative calibrations may be desired. These calibrations comprise profiles that pre-select which vehicle features have priority in the event of conflicting messages.

An exemplary vehicle system response of conflicting individual or multiple manual inputs and individual or multiple input instructions received from autonomous or remote controller 12 when the vehicle 10 is in the autonomous or remote control mode, may be as follows:

Brakes: The vehicle 10 has both mechanical and electrical brake controls. If conflicts occur between the brake pedal input and the brake request command from the controller 12, an override causes the strongest braking request (manned or autonomous/remote) to be implemented. Therefore, an occupant in the vehicle may use the brakes to override remote commands to stop the vehicle 10.

Steering: the steering will not respond to manual input.

Transmission: the transmission will not respond to manual input.

Engine: the accelerator pedal will be non-responsive to manual input.

Lockout Mode

A lockout function of the present disclosure is implemented in a vehicle 10 which supports both manned and autonomous or remote modes. In manned mode, the vehicle operates normally, receiving inputs from a driver through pedals, a steering wheel, and a shift lever. In remote mode, the vehicle 10 operates by receiving commends from an external controller 12 which communicates through a gateway communication interface module 14 which conditions and translates the commands onto the vehicle's CAN network. The lockout function permits only approved third parties to send commands via the vehicle gateway in remote control or autonomous mode. The vehicle 10 behaves in a known way in the event of the loss of or corruption of communication between the vehicle gateway 14 and the external controller 12.

The lockout function is illustratively part of the software which allows a third party to communicate with and drive a vehicle via controller 12 and interface module 14. In lockout mode the vehicle operations may comprise coming to a controlled stop, shifting into park, shutting off the engine, locking the steering column/brakes/clutch, shutting off the display/suspending communications, shut off power to the vehicle, inhibit starting of the vehicle. In order to insure only approved third parties are accessing the gateway module 14, the third party's external controller must successfully complete an authentication sequence. In an illustrated embodiment, authentication is based on a J1939 seed key exchange. It is understood that other authentication techniques may also be used. Another embodiment authentication protocol is described below with respect to FIG. 5.

Entering Lockout Mode

In order to insure only approved third parties are accessing the gateway module 12 in remote mode the third party's external controller 12 must successfully complete an authentication sequence. In one illustrated example, an authentication sequence is based on the J1939 or other seed key exchange. If an authentication sequence is not initiated and completed successfully at least once every five minutes, for example, then the vehicle enters lockout mode. Additionally, if the integrity of the communication, which may be ensured using checksums, message counters, or other communication errors, in any message coming from the external module to the vehicle gateway is compromised the vehicle enters the lockout mode.

Controlling the Vehicle to Execute Lockout Mode

The gateway control module 14 executes lockout mode by ignoring any incoming CAN message from the external controller 12. Then module 14 sends a throttle command of zero over the vehicles internal CAN network and begins to command breaks to stop the vehicle 10. The braking force used is determined by a calibratable map which is dependent on vehicle speed and steering angle. Once the vehicle has stopped moving the transmission is commanded to shift into park and the engine is turned off. The gateway module 14 ignores incoming messages from external controllers 12, keeps the engine off, the transmission in park, and the brakes depressed until lockout mode is exited.

Exiting Lockout Mode

Exiting the lockout mode may occur by reauthentication, reestablishing communication, by a manual key cycle, etc. In one embodiment, the lockout mode is exited once the vehicle 10 has come to a complete controlled stop, the engine is shut off, and the transmission is shifted into park. In another embodiment, the lockout mode may be exited during the shutdown sequence (i.e. before a complete controlled stop has occurred, before the engine is shut off, or before the transmission is shifted into park) if reauthentication or reestablished communication occurs during the shutdown sequence. If the lockout was caused by loss of or corrupt communication, then lockout mode is exited once communication has been reestablished. If lockout mode was caused by a failure to authenticate, lockout mode is exited once an authentication sequence completes successfully. If the conditions to exit lockout mode are satisfied while the vehicle is in the process of stopping, shutting down the engine, and parking, the lockout mode is exited once the vehicle has come to a complete stop, shutdown the engine, and shifted into park.

Figure 3:
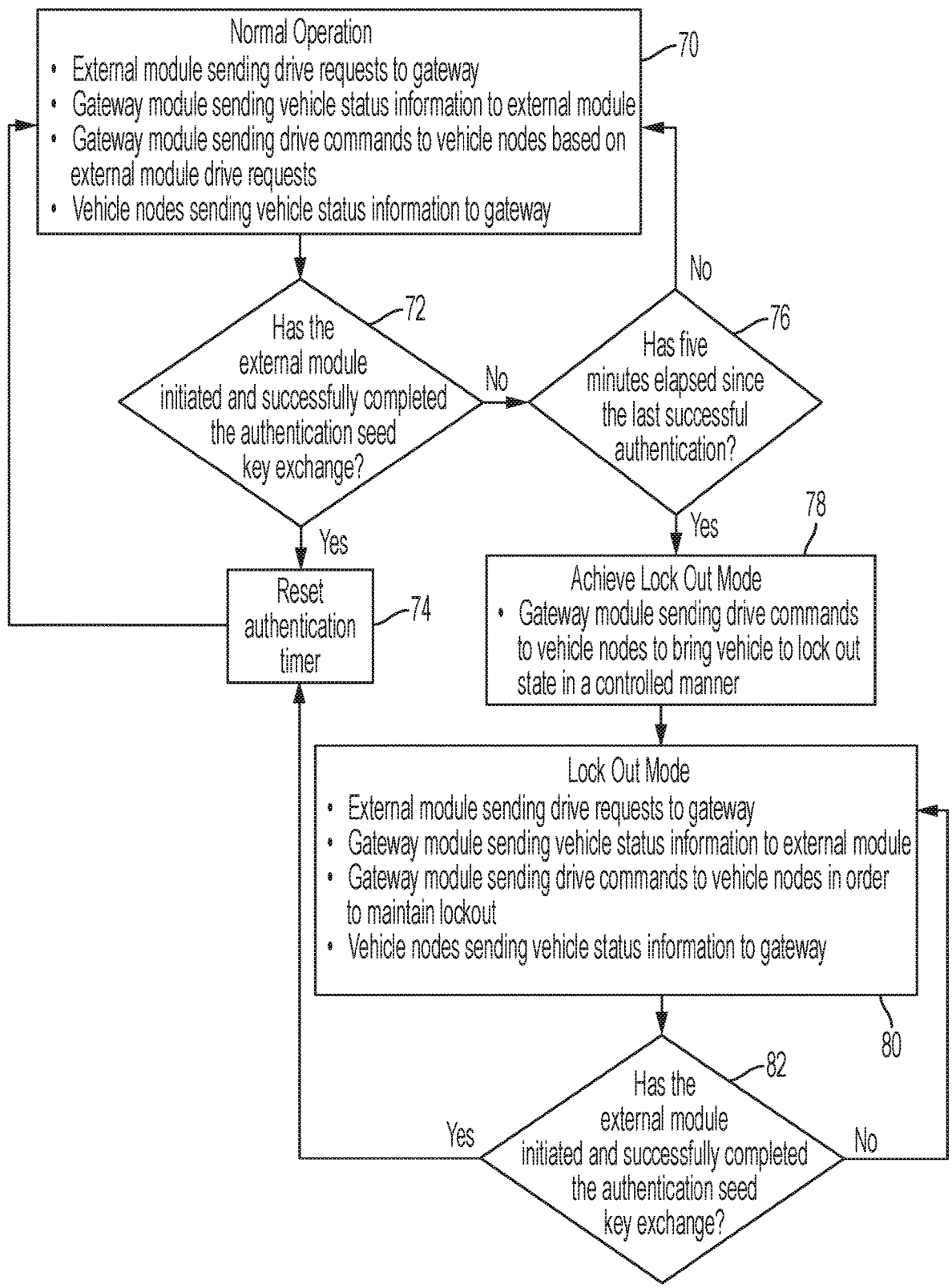
FIG. 3 is a flowchart illustrating steps performed during normal operation in an autonomous or remote control mode and during a lockout mode of operation.

Further details of the normal operation in the autonomous or remote control mode and the lockout mode are illustrated in FIG. 3. During normal operation, as illustrated at block 70, autonomous or remote controller 12 sends drive requests to the communication interface module or gateway interface module 14. The interface module 14 sends vehicle status information to controller 12. Module 14 also sends drive commands to vehicle communication nodes (such as CAN, Ethernet, etc.) based on the drive requests received from controller 12 as discussed above. Vehicle nodes send status information to the interface module 14.

Next, the communication interface module 14 determines whether the autonomous or remote controller 12 has initiated and successfully completed an authentication, such as, for example, a seed key exchange as illustrated at block 72. If authentication was successfully completed at block 72, module 14 resets an authentication timer at block 74 and continues with normal operation at block 70. If authentication was not successfully completed at block 72, module 14 determines whether a predetermined period of time, such as 5 minutes, has elapsed since the last successful authentication, as illustrated at block 76. If the predetermined amount of time has not elapsed at block 76, normal operation continues at block 70. If the predetermined amount of time has elapsed at block 76, module 14 enters a lockout mode at block 78.

Module 14 sends drive commands to the vehicle modes to bring the vehicle to a lockout state in a controlled manner as illustrated at block 78. Module 14 controls braking of the vehicle based upon speed and steering angle of the vehicle to bring the vehicle to a controlled stop. Engine control module 28 then shuts off the engine function at block 32. In the lockout mode, controller 12 may continue sending drive requests to the communication interface module 14. The interface module 14 continues to send vehicle status information to the controller 12. Interface module 14 sends drive commands to the vehicle nodes in order to maintain lockout of the vehicle. The vehicle nodes send status information back to the interface module 14.

In another illustrated embodiment, communications form controller 12 to the vehicle CIM 14 still occurs regardless of the vehicle being in lockout mode. After a predetermined number of failed authentication attempts or a failure in communication, the CIM 14 stops executing commands to the vehicle. Vehicle CIM 14 will still be receive communications from controller 12, but will no longer send communications to controller 12.

In yet another illustrated embodiment, when the vehicle 10 enters lockout mode, the entire vehicle communication network is still functional while the external communication network between controller 12 and CIM 14 is shut down.

In still another illustrated embodiment, active control is provided for individual vehicle nodes of the vehicle communications network. Lockout authentication is applied between any two vehicle nodes or vehicle communications networks to implement lockout functionality. This technique is also be used to prevent an unauthorized vehicle node from being added to the CAN network.

Next, the interface module 14 determines whether the controller 12 has initiated and successfully completed an authentication, such as by a seed key exchange, as illustrated at block 82. If not, interface module 14 maintains the lockout mode at block 80. If the authentication was successful at block 82, interface module 14 resets the authentication timer at block 74 and resumes normal operation in which the vehicle is again controlled by the autonomous or remote controller 12.

When the vehicle 10 is in autonomous or remote control mode, communications failures may occur. In the event of a communications failure, including problems with a message counter and checksum as well as if any J1939 defined "error" messages, the communication interface module 14 enter the lockout mode discussed above. If the remote module commands the brakes at greater than 0% and the throttle at greater than 0%, the communication interface module 14 obeys the brake command, ignores the throttle command, and broadcasts a diagnostic trouble code over the external CAN network. The following are exemplary actions taken by the communication interface module 14 in the event a J1939 "not available" message is received for each subsystem controlled in remote mode. In one example:

Brakes: brake command interpreted as 0%
Steering: steering angle maintained at last valid requested angle
Transmission: requested gear maintained at last valid requested gear
Engine: pedal command interpreted as 0%, engine on/off command interpreted as engine off In one illustrated example, if the CIM 14 receives a brake command and the data says the command is not available, the CIM 14 determines that the command is invalid and waits to see if it receives another message. Limit the number of messages, before a lockout or alternative operation takes place. If multiple input commands (brakes, steering, etc.) are not valid, this could signal a problem and the CIM 14 enters lockout mode to stop these commands from continuing. The CIM 14 may enable options for any pedal commands, any steering commands, pre-set "limp-home" commands, etc. If problems occur with check sum or data errors, then the CIM 14 uses use last valid commands, however, if the conditions are still not valid vehicle will eventually enter a lockout mode or limp home/degrade mode condition.

Remote Vehicle Power Up and Remote Mode Selection

Figure 4:
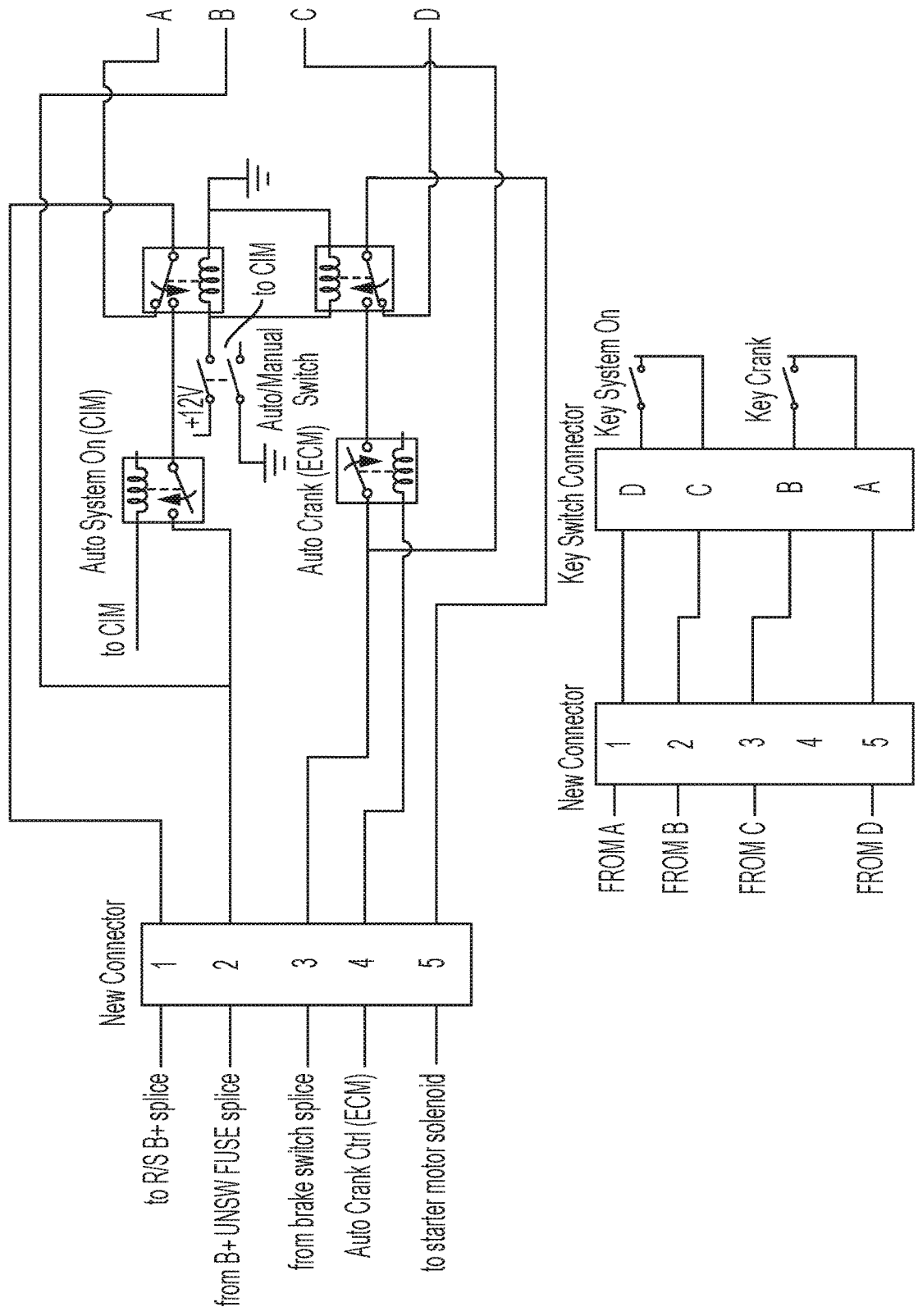
FIG. 4 is an exemplary wiring harness used to provide by-wire override control of the vehicles ignition.

In another embodiment, the system permits remote mode selection and vehicle power up remotely. The communication interface module 14 has a low power mode which wakes when a CAN message is received from controller 12. The mode selection is controlled by a CAN message from the remote controller 12 (if not present default to manual mode). Once woken up, the communication interface module 14 controls the circuit in FIG. 4 in order to bypass the key switch if in remote mode. A conventional wiring harness is modified by adding an inline connector behind the key switch connector as shown in FIG. 4. An auto start control line for the ECM 28 is routed to a 5 pin connector with existing key switch lines. FIG. 4 also shows both sides of a new pass through connector with an auto/manual bypass circuit in-between.

If communication is lost in autonomous or remote control mode while the vehicle 10 is in motion, a "stop procedure" is implemented. The system monitors ground based vehicle speed and steering angle then applies the brakes based on these two inputs to bring the vehicle to a stop. Applications based on a 3D map calibrated to the vehicle (speed, steering angle and brakes percentage) may be used to provide feedback of the surrounding terrain.

In illustrative embodiments, the controller 12 implements one or more of the following features:
Vehicle supervisory control to the level of emulating a human driver
Sensory fusion
Navigation by GPS corrected inertial navigation or other system capable of required precision in determining position
Localization
Lane detection and lane departure
Extensive terrain and obstacle detection, avoidance and database characterization using real-time or near real-time detection, pre-recorded maps and lane structures, trips planned and tracked, collision avoidance system (LIDAR, Video, sensors), and adaptive cruise control.
In the absence of communications from a controller 12, the vehicle has the ability to operate in a full autonomous mode.
The communication interface module 14 may provide:
Run/Auto Start, Speed/Acceleration Control, Steering, Braking, Gear select, and other chassis functions such as lighting
Yaw rate models vs. steering command are used at the vehicle control level
Command modes include target condition and rate with standard and maximum rate of change profiles
Remote dashboard messages.
Creating drive profiles from vehicle sensors
Black out mode
Infrared (IR) mode
Automating driveline control, by executing drive modes including 2 wheel drive, 4 wheel drive and turf mode, etc.
Status messages sent over the CAN include controller conflicting commands, vehicle health data, and state and conditions of vehicle lockout mode.

Still further, embodiments are envisioned where the vehicle 10 (and controller 34) is provided with information regarding the terrain being traversed (via GPS or otherwise, alone or in combination with other sources). This information can include the type of terrain, changes in terrain, or otherwise to inform the vehicle 10 about conditions expected to impact operation thereof. Vehicle 10 then uses this information to impact the operation of the vehicle. In one example, vehicle 10 is determined to be travelling in a cross-hill direction. Vehicle 10 uses this information to impact the stiffness settings of the electrically adjustable shocks to increase vehicle stability. Similarly, other examples include adjusting shock settings by determining whether an on-road or off-road setting is being traversed.

Figure 5:
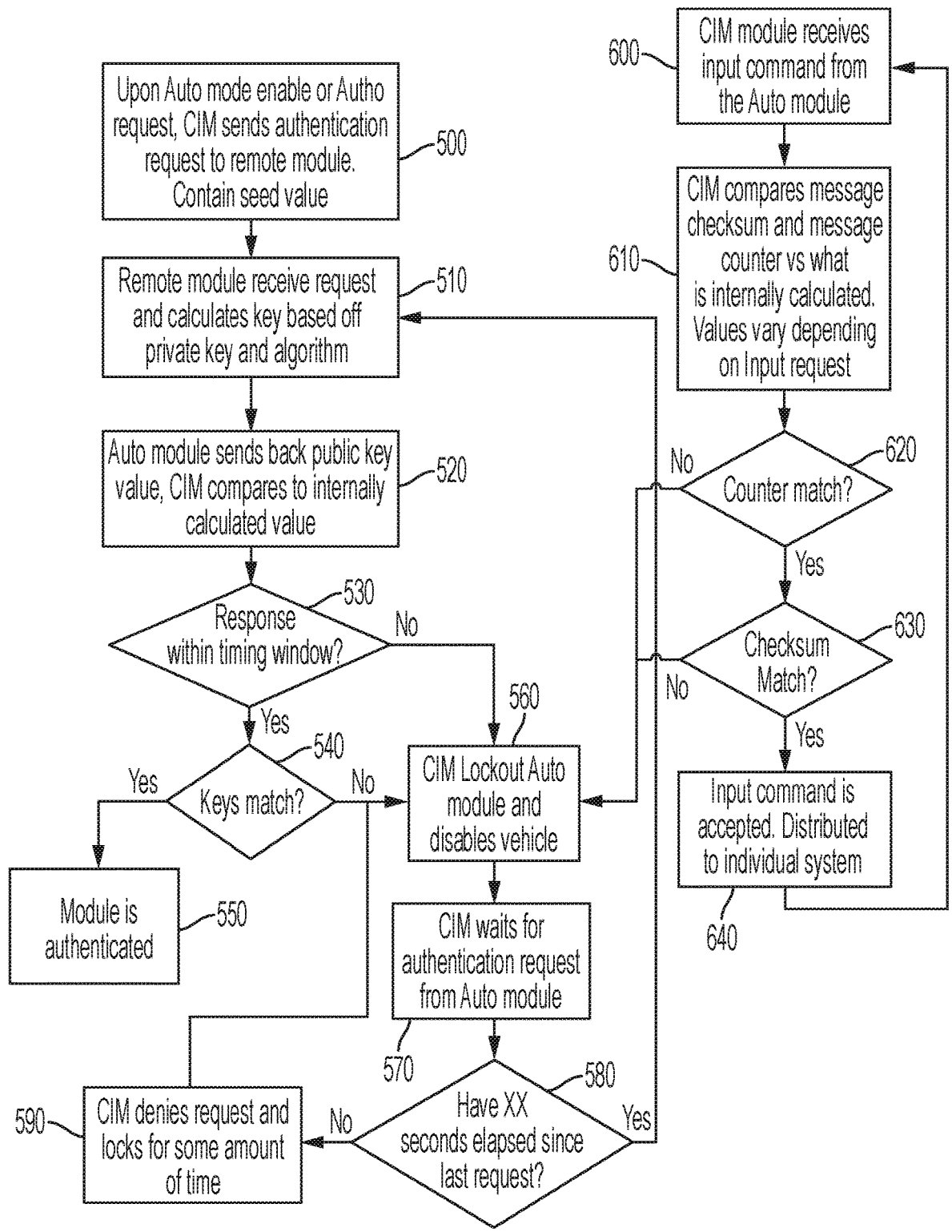
FIG. 5 is a flowchart showing illustrative steps performed to authenticate a module sending instructions to the vehicle.

With reference to FIG. 5, another embodiment authentication protocol is described to ensure only authorized entities are able to access the CAN network to direct operation of the vehicle. Upon enabling autonomous mode, the CIM 14 sends an authentication request to the remote module 12, block 500. The request contains a seed value. The seed value is illustratively a 7-byte long key that is generated to approximate a random number. Remote module 12 receives the request and calculates a key based on the seed value (a private key) and an algorithm, block 510. Module 12 then sends back a public key value to CIM 14, block 520. CIM 14 then compares the returned value to a value it calculated internally and therefore expects to match the returned value to indicate an authentic module 12. Upon receiving the public key value, CIM 14 determines if the response was received within a defined timing window, block 530. This timing requirement limits the ability of a third party to have unlimited time to attempt any number of responses (i.e. a "brute force" hack attempt). If the public key response was received within the required timing window and the public key matches the expected response, block 540, then the module is authenticated and module 12 is permitted to transmit control signals, block 550.

If the public key received within the timing window does not match or if the public key response was received outside of the required window, CIM 14 locks out module 12 and enters a lockout mode (which either disables the vehicle or returns it to manual user control), block 560.

CIM 14 then waits for another authentication request from module 12 (which may be the same or different module 12 that provided the failed public key response), block 570. Upon receiving another authentication request, CIM 14 enforces a delay to again reduce the likelihood of success for a brute-force type attack, block 580. If the delay time has not elapsed, CIM 14 again locks out module 12 and then waits for another authentication request, block 590. If the delay time has elapsed, then CIM 14 returns to block 510 to again attempt to authenticate module 12.

As noted, once a module 12 is authenticated, it is permitted to transmit commands to CIM module 14 for instructing operation of vehicle 10. As part of this, CIM 14 receives an input command from module 12, block 600. Each received message has a checksum and message counter value attached thereto. CIM 14 compares the checksum and counter within the message to what is internally calculated (and therefore expected from the message), blocks 610, 620, 630. If either the counter or checksum do not match, CIM 14 locks out module 12, block 560. If the counter and checksum match, then the received command input is accepted and distributed within vehicle 10 to achieve invocation thereof, block 640.

Figure 6:
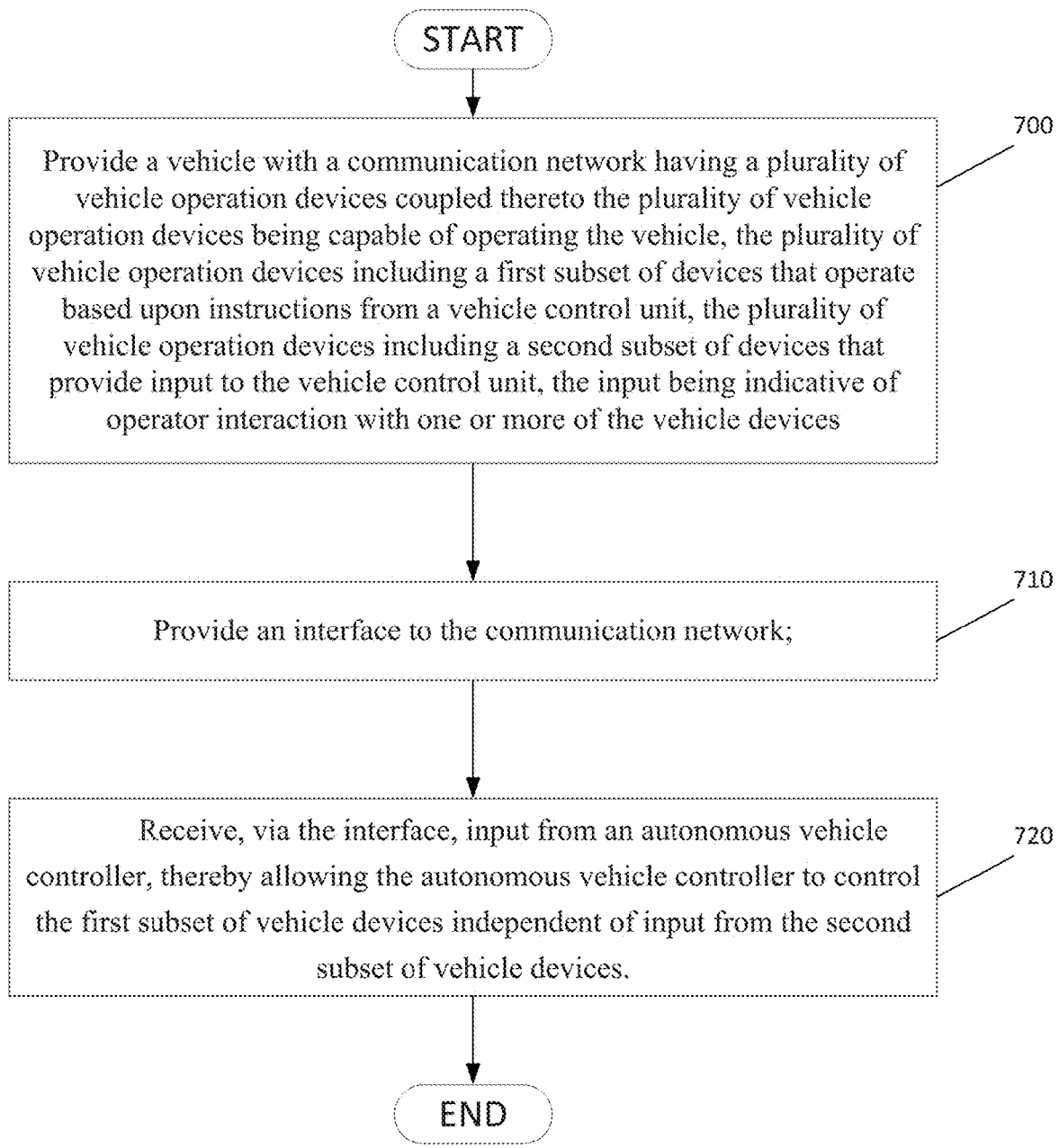
FIG. 6 is a flowchart showing illustrative steps that permit autonomous operation of the vehicle.

Overall, with reference to FIG. 6, it should be appreciated that a method allowing ready connection of a vehicle with an autonomous controller disclosed. A vehicle is provided with a communication network having a plurality of vehicle operation devices coupled thereto, the plurality of vehicle operation devices being capable of operating the vehicle, the plurality of vehicle operation devices including a first subset of devices that operate based upon instructions from a vehicle control unit, the plurality of vehicle operation devices including a second subset of devices that provide input to the vehicle control unit, the input being indicative of operator interaction with one or more of the vehicle devices, block 700. An interface to the communication network is provided, block 710. Input is received via the interface from an autonomous vehicle controller, thereby allowing the autonomous vehicle controller to control the first subset of vehicle devices independent of input from the second subset of vehicle devices, block 720.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Embodiments of the disclosure may be practiced using various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure are implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium includes any medium that includes media capable of containing or storing the program for use by or in connection with the instruction execution system, apparatus, or device.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle comprising:
a plurality of ground engaging members;
a motor coupled to the plurality of ground engaging members, the motor configured to drive the plurality of ground engaging members;
at least one sensor coupled to the vehicle, the at least one sensor being configured to sense at least one operating condition of the vehicle;
a communication interface coupled to the at least one sensor and communicatively coupled to an autonomous controller, the communication interface being configured to:
communicate the at least one operating condition to the autonomous controller; and
receive a command from the autonomous controller based upon the at least one operating condition; and
a vehicle control unit coupled to the communication network and configured to:
receive, via the communication interface, the command from the autonomous controller; and
control operation of the vehicle based upon the command.

2. The vehicle of claim 1, a first sensor of the at least one sensor being configured to sense a terrain being traversed by the vehicle and a second sensor of the at least one sensor being configured to sense a suspension of the vehicle; and the vehicle control unit controlling the suspension based upon the command from the autonomous controller in response to the sensed terrain being traversed and the sensed suspension of the vehicle.

3. The vehicle of claim 1, the at least one sensor being configured to sense a position of the vehicle relative to positions of other vehicles; and the vehicle control unit controlling a speed of the vehicle based upon the command from the autonomous controller in response to the position of the vehicle relative to the positions of the other vehicles.

4. The vehicle of claim 3, the vehicle control unit controlling steering of the vehicle based upon the command from the autonomous controller in response to the position of the vehicle relative to the positions of the other vehicles.

5. The vehicle of claim 1, the vehicle control unit being configured to compare the command received from the autonomous controller to a set of allowable conditions; and block implementation of the command when the command would cause the vehicle to assume a non-allowable state.

6. The vehicle of claim 1, the vehicle control unit being configured to invoke an authentication protocol to determine whether the command is being sent from an authorized autonomous controller.

7. The vehicle of claim 6, wherein upon a determination that the command is received from an unauthorized autonomous controller, the vehicle control unit initiates a shut-down mode.

8. The vehicle of claim 7, wherein the shut-down mode causes the vehicle to come to a stop when the vehicle is in motion and refuses commands from the autonomous controller until such time as the authentication protocol is successfully completed.

9. The vehicle of claim 1, the vehicle control unit configured to receive manual commands; and the vehicle control unit being configured to control operation of the vehicle based upon the received manual commands instead of the command from the autonomous controller, in response to receiving conflicting commands between the received manual commands and the command from the autonomous controller.

10. The vehicle of claim 1, the vehicle control unit configured to receive manual commands; and the vehicle control unit being configured to control operation of the vehicle based upon the received the command from the autonomous controller instead of the received manual commands, in response to receiving conflicting commands between the received manual commands and the command from the autonomous controller.

11. The vehicle of claim 1, the autonomous controller being external to the vehicle.

12. A method for operating a vehicle using an autonomous controller, the method comprising:
  sending, via a communication interface of a vehicle, at least one operating condition to an autonomous controller, wherein the at least one operating condition is sensed by at least one sensor coupled to the vehicle, and wherein the vehicle comprises a plurality of ground engaging members and a motor coupled to the plurality of ground engaging members, the motor configured to drive the plurality of ground engaging members;
  receiving, via the communication interface, a command from the autonomous controller based upon the at least one operating condition; and
  controlling, via a vehicle control unit of the vehicle, operation of the vehicle based upon the command.

13. The method of claim 12, wherein a first operating condition of the at least one operating condition is a terrain being traversed by the vehicle and a second operating condition of the at least one operating condition is a suspension of the vehicle; and wherein controlling operation of the vehicle based upon the command is based upon the terrain being traversed and the suspension of the vehicle.

14. The method of claim 12, wherein a first operating condition of the at least one operating condition is a position of the vehicle relative to positions of other vehicles;
  and wherein controlling operation of the vehicle is controlling a speed of the vehicle based upon the position of the vehicle relative to the positions of the other vehicles.

15. The method of claim 14, wherein controlling operation of the vehicle is controlling steering of the vehicle based upon the position of the vehicle relative to the positions of the other vehicles.

16. The method of claim 12, further comprising comparing the command received from the autonomous controller to a set of allowable conditions; and blocking implementation of the command when the command would cause the vehicle to assume a non-allowable state.

17. The method of claim 12, further comprising invoking an authentication protocol to determine whether the command is being sent from an authorized autonomous controller.

18. The method of claim 17, wherein upon a determination that the command is received from an unauthorized autonomous controller, further comprising initiating a shut-down mode.

19. The method of claim 18, wherein the shut-down mode causes the vehicle to come to a stop when the vehicle is in motion and refuses commands from the autonomous controller until such time as the authentication protocol is successfully completed.

20. The method of claim 12, further comprising receiving manual commands; and controlling operation of the vehicle is based upon the received manual commands instead of the command from the autonomous controller, in response to receiving conflicting commands between the received manual commands and the command from the autonomous controller.

21. The method of claim 12, the vehicle control unit configured to receive manual commands; and the vehicle control unit being configured to control operation of the vehicle based upon the received the command from the autonomous controller instead of the received manual commands, in response to receiving conflicting commands between the received manual commands and the command from the autonomous controller.

22. The method of claim 12, the autonomous controller being external to the vehicle.

* * * * *